(12) United States Patent
Pirk et al.

(10) Patent No.: US 9,941,507 B2
(45) Date of Patent: Apr. 10, 2018

(54) METHOD AND APPARATUS FOR PRODUCTION OF A THIN-FILM BATTERY

(75) Inventors: Tjalf Pirk, Stuttgart (DE); Andreas Krauss, Tuebingen (DE); Thomas Teuschel, Reutlingen (DE); Laura Bohne, Schorndorf (DE)

(73) Assignee: Robert Bosch GmbH, Stuttgart (DE)

( * ) Notice: Subject to any disclaimer, the term of this patent is extended or adjusted under 35 U.S.C. 154(b) by 750 days.

(21) Appl. No.: 13/114,162

(22) Filed: May 24, 2011

(65) Prior Publication Data
US 2011/0294015 A1 Dec. 1, 2011

(30) Foreign Application Priority Data
May 25, 2010 (DE) .................. 10 2010 029 282

(51) Int. Cl.
| | |
|---|---|
| H01M 4/04 | (2006.01) |
| H01M 4/66 | (2006.01) |
| H01M 4/70 | (2006.01) |
| H01M 6/18 | (2006.01) |
| H01M 10/02 | (2006.01) |

(Continued)

(52) U.S. Cl.
CPC ........... *H01M 4/0402* (2013.01); *H01M 4/04* (2013.01); *H01M 4/661* (2013.01); *H01M 4/70* (2013.01); *H01M 6/188* (2013.01); *H01M 10/02* (2013.01); *H01M 10/0436* (2013.01); *H01M 10/0525* (2013.01); *H01M 10/0585* (2013.01);
(Continued)

(58) Field of Classification Search
None
See application file for complete search history.

(56) References Cited

U.S. PATENT DOCUMENTS

| | | | | |
|---|---|---|---|---|
| 4,047,289 A | * | 9/1977 | Wolff | .......................... 29/623.4 |
| 4,080,728 A | * | 3/1978 | Buckler | ...................... 29/623.4 |

(Continued)

FOREIGN PATENT DOCUMENTS

| | | |
|---|---|---|
| CN | 1945881 A | 4/2007 |
| CN | 100483831 C | 4/2009 |

(Continued)

OTHER PUBLICATIONS

Bates et al., Rechargeable Solid State Lithium Microbatteries, Micro Electro Mechanical Systems, Proceedings an Investigation of Micro Structures, Sensors, Actuators, Machines and Systems., Feb. 1993, pp. 82-86, DOI: 10.1109/MEMSYS.1993.296957, IEE, Ft. Lauderdale, FL U.S.A. (5 pages).

(Continued)

*Primary Examiner* — Ula C Ruddock
*Assistant Examiner* — Tony S Chuo
(74) *Attorney, Agent, or Firm* — Maginot, Moore & Beck LLP (57) ABSTRACT

A method for production of a thin-film battery includes providing a mount structure, applying of a first unmasked flow of a first electrode material to the mount structure in order to form a first electrode layer, applying a second unmasked flow of a battery material in order to form a battery layer, and applying a third unmasked flow of a second electrode material in order to form a second electrode layer. The applying steps are repeated in order to produce a thin-film battery which consists of a plurality of first electrode layers, a plurality of battery layers, and a plurality of second electrode layers.

6 Claims, 9 Drawing Sheets

(51) Int. Cl.
*H01M 10/04* (2006.01)
*H01M 10/0525* (2010.01)
*H01M 10/0585* (2010.01)
*H01M 6/40* (2006.01)
*H01M 10/0562* (2010.01)
*H01M 10/0565* (2010.01)

(52) U.S. Cl.
CPC .......... *H01M 6/40* (2013.01); *H01M 10/0562* (2013.01); *H01M 10/0565* (2013.01)

(56) References Cited

U.S. PATENT DOCUMENTS

| | | | |
|---|---|---|---|
| 5,512,387 A * | 4/1996 | Ovshinsky | 429/152 |
| 5,612,152 A * | 3/1997 | Bates | 429/152 |
| 6,645,675 B1 * | 11/2003 | Munshi | 429/305 |
| 8,445,139 B2 * | 5/2013 | Hosaka et al. | 429/245 |
| 2002/0001746 A1 * | 1/2002 | Jenson | 429/162 |
| 2002/0110733 A1 | 8/2002 | Johnson | |
| 2004/0185310 A1 * | 9/2004 | Jenson et al. | 429/7 |
| 2004/0258984 A1 * | 12/2004 | Ariel et al. | 429/152 |
| 2004/0265692 A1 | 12/2004 | Long et al. | |
| 2005/0118502 A1 * | 6/2005 | Honda et al. | 429/218.1 |
| 2005/0132562 A1 * | 6/2005 | Saito et al. | 29/623.5 |
| 2007/0015061 A1 * | 1/2007 | Klaassen | H01M 4/13 429/322 |
| 2008/0070108 A1 * | 3/2008 | Lin et al. | 429/162 |
| 2009/0208671 A1 * | 8/2009 | Nieh et al. | 427/596 |
| 2009/0246636 A1 * | 10/2009 | Chiang et al. | 429/231.95 |
| 2010/0136411 A1 * | 6/2010 | Yoon et al. | 429/144 |
| 2011/0014521 A1 * | 1/2011 | Matsuyama | H01M 4/0404 429/217 |
| 2011/0076550 A1 * | 3/2011 | Liang et al. | 429/175 |
| 2011/0200868 A1 * | 8/2011 | Klaassen | 429/163 |

FOREIGN PATENT DOCUMENTS

WO 2004/093223 A2 10/2004
WO 2008/004161 A2 1/2008

OTHER PUBLICATIONS

Long et al., Three-Dimensional Battery Architectures, 2004, pp. 4463-4492, Chem. Rev. 2004,104, American Chemical Society, U.S.A (30 pages).

* cited by examiner

METHOD AND APPARATUS FOR PRODUCTION OF A THIN-FILM BATTERY

This application claims priority under 35 U.S.C. §119 to patent application no. DE 10 2010 029 282.6, filed May 25, 2010 in Germany, the disclosure of which is incorporated herein by reference in its entirety.

BACKGROUND

The present disclosure relates to a method for production of a thin-film battery, to a barrier for a mount structure for production of a thin-film battery, and to an energy store.

Lithium-ion rechargeable batteries have a considerably higher power density than other rechargeable batteries. Batteries are produced by means of semiconductor methods using thin-film technology, for example as described in Bates et al., Rechargeable solid state lithium ion batteries, Proc. IEEE MEMS Conf., 1993, but with low power.

In the case of so-called 3D batteries, the useful area for thin-film batteries is folded over a structured substrate, as is described in Long et al., Three-Dimensional Battery Architectures, Chem. Rev. 104, 2004. Therefore, several times the capacity, for example 40 times the capacity, is stored on the same substrate base surface and, furthermore, the stored charge is absorbed and emitted more quickly. Higher power is therefore also available. Thin-film batteries can use either a planar substrate or a non-conductive substrate which is provided with structures, for example silicon structures with passivation, produced by trenches of silicon, followed by isolation and passivation, for example thermal oxidation. This surface enlargement which is produced in this way by means of the substrate in the battery layers, the so-called 3D batteries, leads to an increase in capacity. A current collector material, for example Pt, a cathode layer, for example $LiCoO_2$, the electrolyte, for example Li polymer, and a further electrode, for example graphite, Al, are then typically applied to the substrate, possibly with an insulating layer.

SUMMARY

Against this background, the present disclosure provides a method for production of a thin-film battery, as well as a barrier for a mount structure for production of a thin-film battery, and an energy store. Advantageous refinements will become evident from the following description.

The disclosure is based on the discovery that a capacity of thin-film batteries can be increased by connecting different cells in parallel or in series within a thin-film battery. At the same time, it is thus possible to considerably reduce the production costs per unit capacity for a thin-film battery.

One essence of the disclosure is in this case the use of a plurality of layers of electrode materials and battery materials to produce individual cells within a thin-film battery, by means of different methods for production of the batteries by position-resolved deposition and removal, preferably in-situ.

A further core concept of the disclosure is surface enlargement, which is provided not only in the mount material but additionally or exclusively in the electrode material. For this purpose, it is possible in particular to use a metal layer, which is porous on the surface or else all the way through, but is conductive, for example a so-called platinum foam or platinum black, but likewise also an aluminum layer which has been roughened, for example by an electrolytic process. It is also possible to use nanowires or nanotubes as the electrode material, which likewise have very high specific surface areas. A further essence of the disclosure is to use a continuous or structured insulating layer on and around the electrode material, which makes it possible to achieve a high energy density and flexibility in the design of the batteries.

In general, thin-film batteries consist of a substrate, for example silicon, possibly with structuring for surface enlargement as a so-called 3D battery, an insulating layer, if the substrate is conductive, a current collector material, for example platinum, a cathode layer, for example $LiCoO_2$, the electrolyte, for example lithium polymer or a further electrode, for example graphite or Al. By way of example, the storage capacity of a thin-film battery can be increased by connecting different battery layers in series. This can be done very easily, and all that is necessary is to deposit a plurality of batteries one on top of the other. The increase in capacity is, however, achieved in this case by means of a total voltage, which rises with the number of layers, quickly reaches the limits of the available material, and therefore cannot be scaled indefinitely. Parallel connection of cells which are located one on top of the other requires complex contacts, for which suitable production methods are required, as will be described in the present disclosure.

The present disclosure provides a method for production of a thin-film battery, which has the following steps: provision of a mount structure; application of a first unmasked flow of a first electrode material to the mount structure in order to form a first electrode layer on the mount structure; application of a second unmasked flow of a battery material to the mount structure in order to form a battery layer on the first electrode layer; application of a third unmasked flow of a second electrode material to the mount structure in order to form a second electrode layer on the battery layer; and repetition of the application steps in order to produce a thin-film battery which consists of a plurality of first electrode layers, a plurality of battery layers and a plurality of second electrode layers.

The method according to the disclosure creates a stack structure of electrode layers and battery layers. The main surfaces of adjacent layers may be adjacent to one another, that is to say, for example, they are located one on top of the other in the form of a stack. The individual layers can be applied successively and alternately with respect to one another to the mount structure, or to layers which are already located on the mount structure, thus resulting in a plurality of individual battery cells, which can in turn be interconnected in order to create a thin-film battery which consists of a plurality of individual battery cells. The electrode layers consist of an electrically conductive material. The battery layer has an electrolyte. A battery layer is in each case applied between two different electrode layers in order to form a battery cell. The electrode layers can be used to make contact with the battery cell. The mount structure may represent a substrate which forms a base layer on which the further layers can be applied. These may be applied by means of suitable methods, for example deposition methods. Unmasked application can mean that the material to be applied is applied in an unstructured manner to the mount structure. In this case, unstructured means that no mask, and in particular no temporary mask, is used, in order to structure the flow of the material to be applied, before it is applied to the mount structure, in order to limit its area extent.

According to one embodiment, a sequence of the steps of application is carried out such that at least one battery layer is formed on a first electrode layer, and at least one further battery layer is formed on a second electrode layer. If the battery layers to be applied successively are applied alternately to a first electrode layer and a second electrode layer, then a battery layer is in each case located between two adjacent electrode layers. There is therefore no need for electrical insulation, which is otherwise required between adjacent electrode layers.

However, if insulating layers are required, then an insulating material can be applied to the mount structure in a step of application of a fourth unmasked material flow. By way of example, this makes it possible to form an insulating layer on one of the first electrode layers, or on one of the second electrode layers. The insulating layer makes it possible to achieve electrical insulation between directly adjacent first and second electrode layers.

The first and/or the second electrode material can be applied such that the first and/or the second electrode layer have/has a porous structure. The porous structure can result from a specific characteristic of the corresponding electrode material, or from a specific application method. The porous structure can enlarge the surface area of the respective electrode layer. This simplifies the construction, and therefore also the production costs for the thin-film battery. At the same time, the packing density and the storage capacity are increased.

According to one embodiment, the method according to the disclosure may comprise a step of exposure of end areas of the first electrode layers and/or of end areas of the second electrode layers, and having a step of making contact between the end areas of the first electrode layers and/or the end areas of the second electrode layers. The end areas may be located on narrow faces of the respective layers. The respective end areas of the first electrode layers can be arranged opposite the respective end areas of the second electrode layers. The exposure process makes it possible to remove material which surrounds the end areas. For example, end areas of adjacent battery layers or of the respective other electrode layers can be removed. The exposure process can be carried out, for example, by means of a chemical or a physical etching process, a plasma process or an electrochemical treatment. The contact can be made by electrically conductively connecting the exposed end areas. Contact is made between end areas of the electrode layers in an in situ production method such that there is no need for a step of realignment of the thin-film battery. According to this embodiment, the electrodes are exposed selectively after unstructured deposition of the material which forms the layers.

According to a further embodiment, the mount structure may have a base surface with a first barrier and a second barrier, which is arranged opposite the first barrier. The first unmasked material flow may be applied obliquely over the first barrier to the base surface. The third unmasked material flow may be applied obliquely over the second barrier to the base surface. The barriers may project out of the base surface, and may form walls. For example, the barriers may be in the form of small towers. The barriers are firmly connected to the mount structure. Alternatively, the mount structure may have a depression, for example in the form of a trough. The base surface can then form the trough base, and the barriers the walls. The layers are applied such that the layer structure of the thin-film battery is produced in an intermediate space between the first and the second barriers. Because the electrode materials are in each case applied obliquely, the barriers form shadow masks for the electrode material, which is in each case applied from a side facing away from the intermediate space between the barriers. This allows the electrode layers to be structured without any need for a mask which, for example, would in each case have to be replaced when the respective other electrode layer is applied. The mask for structuring of the electrode material and of the layers which are formed by the electrode material is provided by the barriers, that is to say by the structure of the mount material on which the thin-film battery is formed. The respective material flow is masked by a shadow effect of the barriers, once it has come into contact with the mount structure or with the barriers, which are part of the mount structure. Furthermore, when the electrode materials are being applied, a contact layer can in each case additionally be formed on the wall areas of the barriers, and can be used in each case to make contact between electrode layers of the same type.

The second unmasked flow can be applied at right angles to the mount structure. The battery material can thus be applied in the intermediate space between the barriers such that the barriers do not form shadow masks for the flow of the battery material. The battery layers can therefore extend over the entire area between the barriers.

The present disclosure furthermore provides a barrier for a mount structure for production of a thin-film battery, having the following features: a first partial barrier and a second partial barrier, which are arranged on a base surface of the mount structure and are separated from one another by an intermediate space; an electrically conductive first contact layer, which is formed on a side of the first partial barrier opposite the base surface, and an electrically conductive second contact layer, which is formed on a side of the second partial barrier opposite the base surface; and an insulating cover, which is arranged on the first and the second contact surfaces and covers the intermediate space.

The mount structure may have a plurality of barriers which are arranged adjacent to one another. There is an intermediate space between each two adjacent barriers, in each of which layers of a thin-film battery can be applied. To this end, a method according to the disclosure for production of a thin-film battery according to one embodiment can be carried out, in which the electrode material is applied obliquely over the barriers, such that these form shadow masks for the electrode material. The intermediate space can form an electrically isolating area between the partial barriers. The contact layers can be provided for subsequently making contact with the thin-film battery. The isolating cover makes it easier to remove layers which are not required and are applied to the barrier during the process of producing the thin-film battery.

According to one embodiment of the barrier according to the disclosure, the first partial barrier may have a cutout along one side surface. An electrical contact, which passes through an opening in the base surface, can be arranged in the cutout. Contact can be made with the thin-film battery from the rear face by means of a contact such as this.

The present disclosure furthermore relates to an energy store having the following features: a first electrode, which is formed from a metal and has a porous surface structure; a second electrode; and a battery layer, which is arranged between the first and the second electrodes and is connected to the porous surface structure of the first electrode. By way of example, the energy store may be in the form of a thin-film battery. The energy density of the energy store can be increased by means of the porous surface structure. For example, the first electrode may be formed from platinum or aluminum.

BRIEF DESCRIPTION OF THE DRAWINGS

The disclosure will be explained in more detail in the following text with reference, by way of example, to the attached drawings, in which.

DETAILED DESCRIPTION

The following description of preferred exemplary embodiments of the present disclosure uses the same or similar reference symbols for those elements which are illustrated in the various figures and have similar effects, and these elements will not be described repeatedly.

Figure 1:
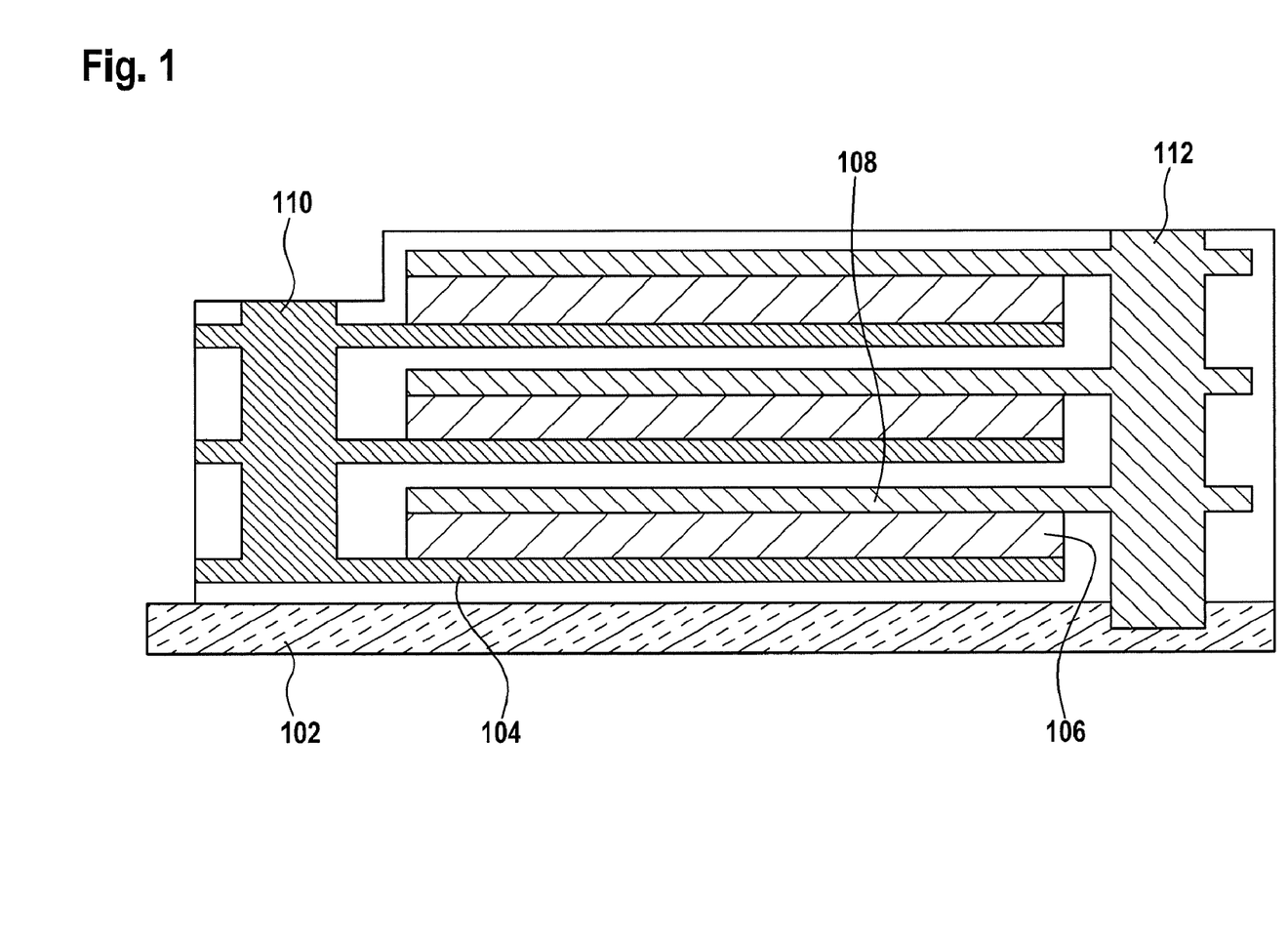
FIG. 1 shows a thin-film battery, according to one exemplary embodiment of the present disclosure.

FIG. 1 shows a cross section through a thin-film battery with parallel-connected thin-film battery cells, according to one exemplary embodiment of the present disclosure. The thin-film battery has three individual battery cells, which are arranged stacked one on top of the other on a mount structure 102. Each of the individual battery cells has a first electrode layer 104, a battery layer 106 and a second electrode layer 108. Adjacent electrode layers 104, 108 are each separated from one another by an isolating layer. The mount structure 102 forms a base surface. The layers 104, 106, 108 of the three individual battery cells are aligned parallel to the base surface. The layers 104, 106, 108 of an individual battery cell are each directly adjacent to one another. The three individual battery cells are connected in series. For this purpose, the first electrode layers 104 of the three individual battery cells are electrically connected to one another via a first via 110. In a corresponding manner to this, the second electrode layers 108 of the three individual battery cells are electrically connected to one another via a second via 112.

The battery layers 106 of the three individual battery cells have the same surface area and are aligned with respect to one another. The battery layers 106 on a side facing the mount structure 102 are completely covered by the respectively adjacent first electrode layers 104. The battery layers 106 on a side facing away from the mount structure 102 are completely covered by the respectively adjacent second electrode layers 108. The first electrode layers 104 extend beyond the battery layers 106 in the direction of the first via 110. The first via 110 connects each of the first electrode layers 104 to end sections, which project over the battery layers 106, of the first electrode layers 104. In a corresponding manner, the second electrode layers 108 extend beyond the battery layers 106 in the direction of the second via 112. The second via 112 connects each of the second electrode layers 108 to an end section, which projects over the battery layers 106, of the second electrode layers 108. The vias 110, 112 are at right angles to the mount structure 102, and are arranged on opposite sides of the layer stack of the thin-film battery.

The mount structure 102 may be in the form of a mount substrate. The first electrode layers 104 form a first battery electrode, and the second electrode layers 108 form a second battery electrode. There is an area with only the first electrode 104 and the first via 110 in a section of the thin-film battery around the first via 110. There is an area with only the second electrode 108 and the second via 112 in a section of the thin-film battery around the second via 112. Intermediate spaces between the layers 104, 106, 108 and the vias 110, 112 are passivated or have insulation material. One surface of the thin-film battery can be coated with upper insulation on a side opposite the mount substrate 102. The vias 110, 112 can extend through the upper insulation, thus allowing contact to be made with the thin-film battery through the vias 110, 112. The vias 110, 112 may extend into the mount substrate 102, or may extend only to that electrode layer 104, 108 which is closest to the mount substrate 102. The illustrated thin-film battery may also have more or less than the three illustrated individual battery cells.

FIG. 1 shows an example of the design of a thin-film battery with three individual battery cells, connected in parallel. These cells are separated from one another by insulating layers. In the illustrated design, the individual cells are connected to one another through vias 110, 112. The vias 110, 112 may at the same time form a contact on the upper face of the battery arrangement, or else, as in the case of the second via 112, may make contact only with or also with the mount substrate 102. It is advantageous to use insulating layers which are formed or deposited on the surface of an electrode layer 104, 108.

Figure 2:
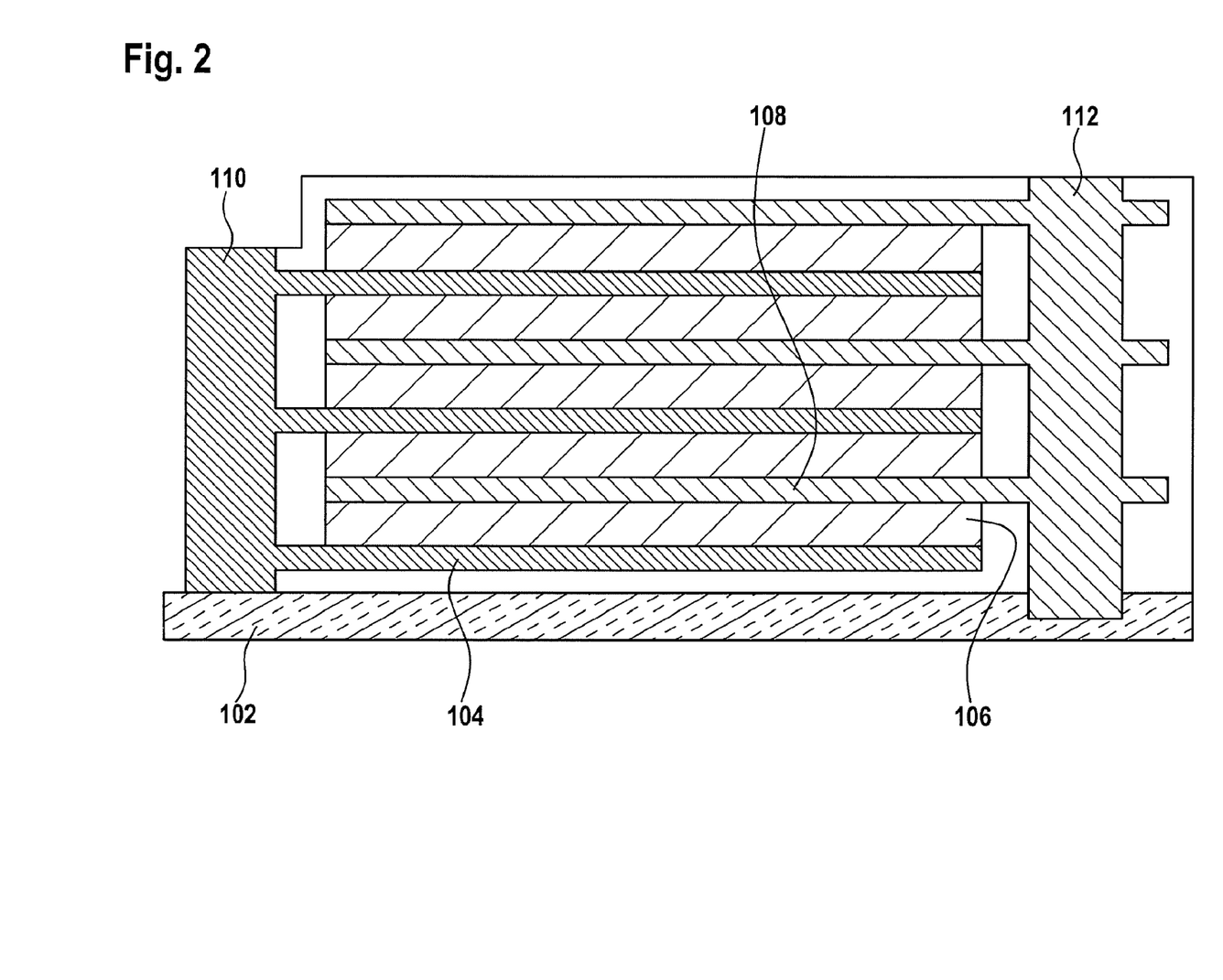
FIG. 2 shows a thin-film battery, according to a further exemplary embodiment of the present disclosure.

FIG. 2 shows a cross section through a thin-film battery with parallel-connected thin-film battery cells, according to a further exemplary embodiment of the present disclosure. The thin-film battery has five individual battery cells, which are arranged stacked one on top of the other on the mount structure 102. Corresponding to the exemplary embodiment described with reference to FIG. 1, each of the individual battery cells has a first electrode layer 104, a battery layer 106 and a second electrode layer 108. Adjacent individual battery cells each divide an electrode layer 104, 108. Adjacent individual battery cells correspondingly each have a layer structure with an opposite profile. The battery layers 108 are therefore arranged in the respectively reverse sequence. For example, that individual battery cell which is closest to the mount structure 102 has the first electrode layer 104 at the bottom, the battery layer 106 arranged thereon, and the second electrode layer 108 arranged on the latter. The individual battery cell which is arranged above this has the second electrode layer 108 at the bottom, which at the same time acts as the second electrode layer 108 for the individual battery cell located underneath it, the battery layer 106 arranged thereon, and the first electrode layer 104 arranged on the latter. This means that no insulating layers are required between adjacent electrode layers 104, 108. An insulating layer can also be arranged between the mount substrate 102 and the lowermost first electrode layer 104. The insulating layer may be in the form of passivation or may be composed of an insulating material. Contact can be made with the electrode layers 104, 108 by means of the vias 110, 112, in a corresponding manner to the exemplary embodiment illustrated in FIG. 1. According to this exemplary embodiment, the first via 110 is arranged at an outer edge of the thin-film battery. The first via 110 is not coated with insulation on the outer face opposite the layers 104, 106, 108. The first via 110 therefore forms an external connection for the first electrodes 104. There is an area with only the second electrode 108 and the second via 112 in a section of the thin-film battery around the second via 112. The illustrated thin-film battery may also have more or less than the five individual battery cells shown.

As a simplification to the exemplary embodiment shown in FIG. 1, in the exemplary embodiment shown in FIG. 2, there is no insulation between the individual electrodes 104, 108 of the separated cells at the location of the battery layers 106, and the battery layers 106 can be applied in the respectively appropriate sequence between all of the electrodes 104, 108. FIG. 2 furthermore shows one possible way to make contact with the batteries from the outside.

Figure 3:
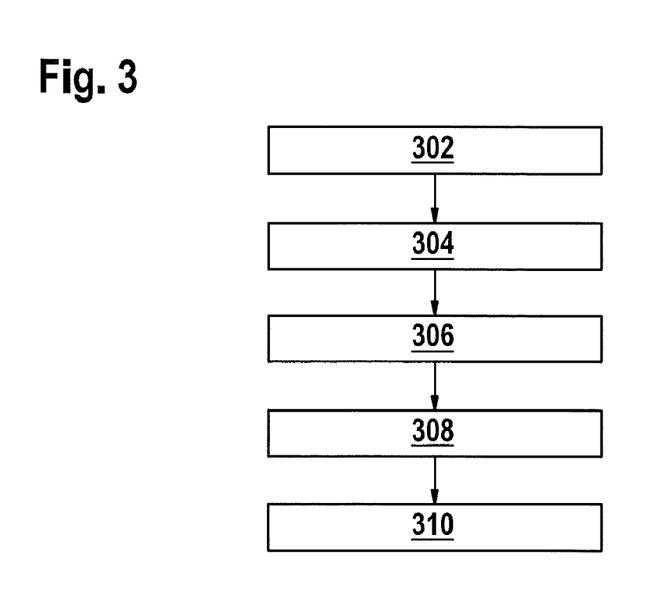
FIG. 3 shows a flowchart of a method for production of a thin-film battery, according to one exemplary embodiment of the present disclosure.

FIG. 3 shows a flowchart of a method for production of a thin-film battery, according to one exemplary embodiment of the present disclosure. The method can be used to produce the thin-film batteries illustrated in FIGS. 1 and 2.

In a first method step 302, a mount structure is produced. The mount structure, which is also referred to as a mount substrate, may be in the form of a planar surface or may have surface structures. In further steps 304, 306, 308, individual layers can be applied successively in time to the mount structure resulting in the individual layers being located one on top of the other. In this case, the individual layers may be applied in an unstructured form. This means that a material flow, by means of which the individual layers are each applied, is not passed through a mask, but arrives at the mount structure, or at layers arranged on the mount structure, without being masked. The material flow can in each case arrive at the mount structure at right angles. A first electrode material can be applied in step 304, in order to form a first electrode layer. In step 306, a battery material can be applied, in order to form an electrode layer. In step 308, a second electrode layer can be applied, in order to form a second electrode layer. The steps 304, 306, 308 can be carried out in any desired sequence and can be repeated in order, for example, to produce the layer structures illustrated in FIGS. 1 and 2. A step of application of an insulating layer can be carried out between the individual steps 304, 306, 308. End sections of the electrode layers formed in steps 304, 308 can be exposed, and made contact with, in a step 310, as is described in more detail with reference to FIGS. 4a to 4c.

Figure 4A:
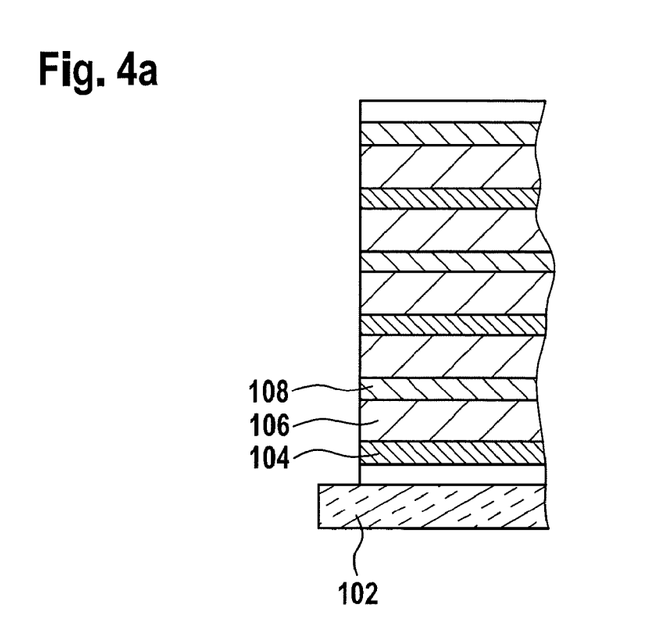
FIGS. 4a to 4c show a thin-film battery in various production stages, according to one exemplary embodiment of the present disclosure.
Figure 4B:
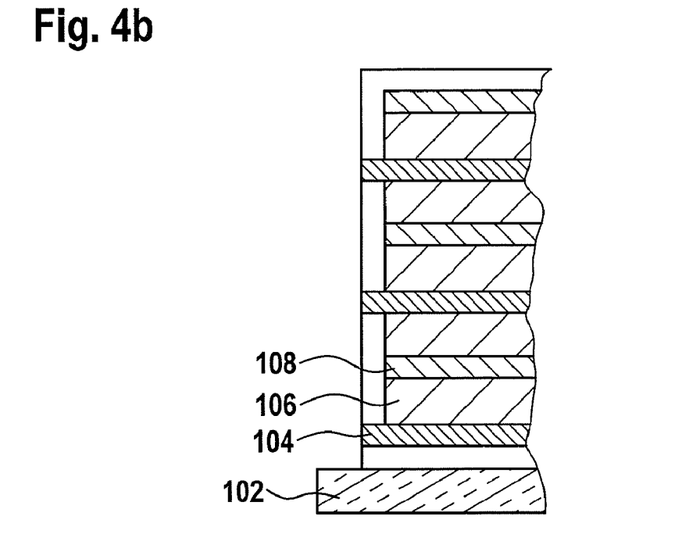
Figure 4C:
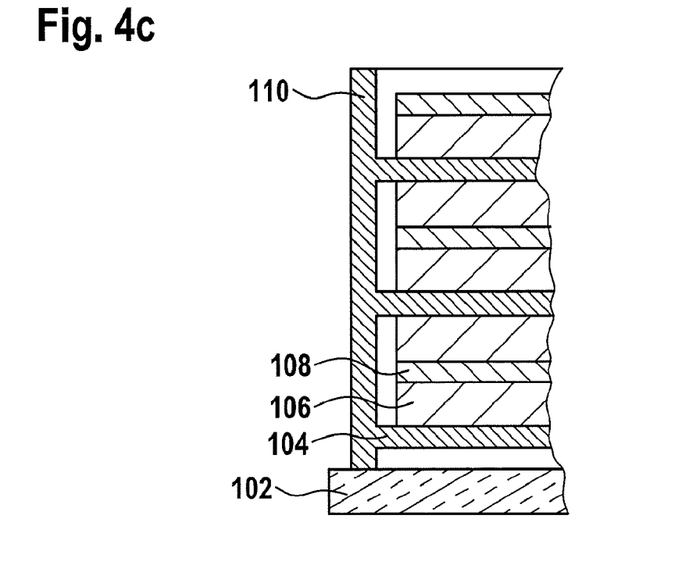

FIGS. 4a to 4c show a thin-film battery in various production stages, according to one exemplary embodiment of the present disclosure. In particular, method steps are shown in which electrode layers are exposed and made contact with.

FIG. 4a shows a cross-sectional illustration of a layer structure of a thin-film battery. The layer system may correspond to the thin-film battery described with reference to FIG. 2. The figure shows a mount substrate 102 on which a first electrode layer 104, a battery layer 106, a second electrode layer 108 and then once again a battery layer 106, a first electrode layer 104 etc. are applied. An insulating layer can once again be arranged between the lowermost first electrode layer 104 and the mount substrate 102, and on the uppermost second electrode layer 108. The layers may have been built up using the method steps described with reference to FIG. 3. In particular, the layers 104, 106, 108 may have been deposited in an unstructured form. The layers 104, 106, 108 terminate uniformly, at least at one edge, thus creating a straight-line edge area. The mount substrate 102 may project over the edge area. The edge area may be cut, thus resulting in a cut layer stack formed from, for example, an unstructured layer structure, as is shown in FIG. 4a.

FIG. 4b shows the layer stack as shown in FIG. 4a with the first electrode 104 exposed, and with an insulating layer. End areas of the first electrode layers 104 are selectively exposed, and project over the ends of the battery layers 106 and of the second electrode layers 108. The straight-line edge area shown in FIG. 4a can be machined in order to expose them, such that end sections of the battery layers 106 and of the second electrode layers 108 are removed. Cavities created in this way can be filled with an insulating layer, thus once again forming a straight-line edge area.

FIG. 4c shows the layer stack as shown in FIG. 4b with a first electrode 104 connected. For this purpose, an electrically conductive contact-making layer 110 can be applied to the straight-line edge area, and can be electrically conductively connected to the ends of the first electrode layers 104. The contact-making layer 110 may be in the form of an edge strip or a via.

FIGS. 4a to 4c therefore schematically illustrate a production method for a contact 110 for parallel-connected thin-film battery cells.

Particularly in the case of the external contact 110, the insulating layers need not necessarily be deposited during the construction of the battery layer stack but can also be formed at the necessary points by an appropriate method, as is illustrated by way of example in FIGS. 4a to 4c. This can be done, for example, by cutting (FIG. 4a) the layer stack by a laser and/or subsequent thermal, chemical or physical etching processes, plasma processes or electrochemical treatment (FIG. 4b). Different electrode materials can be exposed selectively for connection of anodes and cathodes by repetition of this process, possibly with the parameters being varied, while forming insulating layers at the same time, or in each case subsequently. The major advantage in this case is that a large area can be continuously covered with thin-film battery layers, for example on a silicon wafer. A large number of individual batteries can be produced at the same time by appropriate cutting and contact-making methods.

It is also possible merely to introduce suitable isolation cuts, for example by means of a laser in situ, and the contact with the various electrode types can finally be made by laser sintering through the various electrode layers 104, 108 and electrolyte layers 106.

Figure 5:
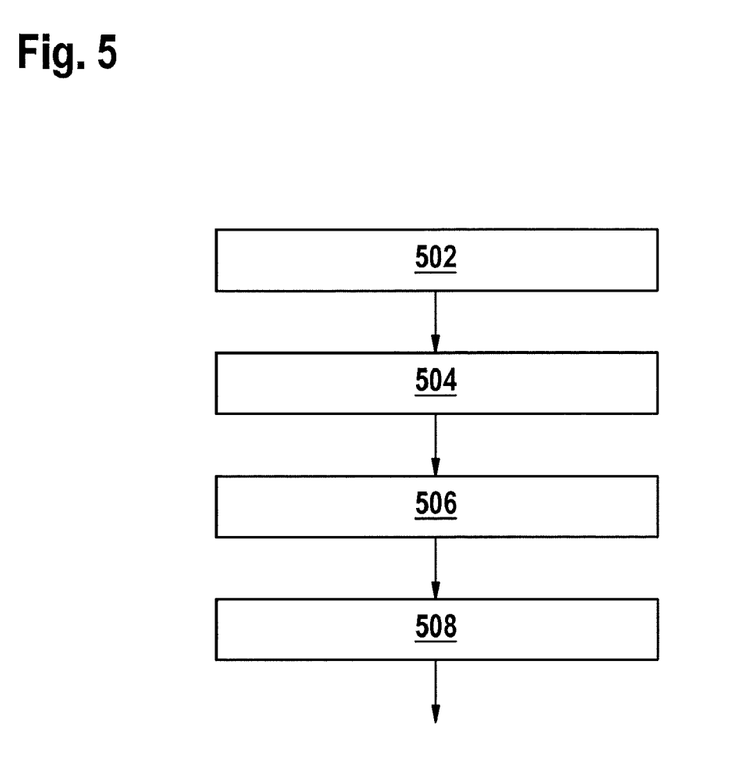
FIG. 5 shows a flowchart of a method for production of a thin-film battery, according to a further exemplary embodiment of the present disclosure.

FIG. 5 shows a flowchart of a method for production of a thin-film battery, according to a further exemplary embodiment of the present disclosure. In this case, a mount structure is used which has one or more rigidly connected shadow masks, by means of which the electrode material can be structured, as is illustrated in FIG. 6.

A mount structure is produced in a first method step 502. The mount structure, which is also referred to as a mount substrate, may be in the form of a planar surface or may have surface structures. In further steps 504, 506, 508, individual layers may be applied successively in time to the mount structure, such that these individual layers are located one on top of the other. The individual layers may in this case be applied in an unstructured form to the mount structure, structures of the mount structure or layers located thereon. This means that a material flow by means of which each of the individual layers is applied is not passed through a mask, but is applied in an unmasked form to the mount structure or to structures or layers arranged on the mount structure. The material flow may in each case arrive at the mount structure from different directions. In step 504, a first electrode material can be applied, in order to form a first electrode layer. With respect to alignment of the base surface of the mount structure, the first electrode material may be applied at an angle other than 90°, that is to say obliquely, for example at an angle between 30° and 70°. In this case, the first electrode material may be structured by a shadow mask, which results from the surface structure or mount structure. A flow of the first electrode material passing through the shadow mask can arrive in a structured form at an area of the mount structure on which the layers of the thin-film battery are applied. In step 506, a battery layer material may be applied in order to form a battery layer. The battery layer material may be applied at right angles, for example at an angle of 90° or virtually 90°, to the base surface of the mount substrate. In step 508, a second electrode material can be applied, in order to form a second electrode layer. The second electrode material may be applied at an angle other than 90°, for example 45°. In this case, the second electrode material can be structured by a further shadow mask for the mount structure. A flow of the second electrode material passing through the shadow mask can arrive in a structured form at an area of the mount structure on which the layers of the thin-film battery are applied. The second electrode material may be applied from a different direction than the first electrode material, for example from the opposite direction. Steps 504, 506, 508 can be carried out and repeated in any desired sequence in order, for example, to produce the layer structures shown in FIGS. 1 and 2. A step of application of an insulating layer can be carried out between the individual steps 504, 506, 508. For this purpose, an insulating material can be applied at right angles to the base surface of the mount substrate. In a subsequent step, undesired areas of the applied layers can be removed, and electrical contact can be made with the applied electrode layers.

Figure 6:
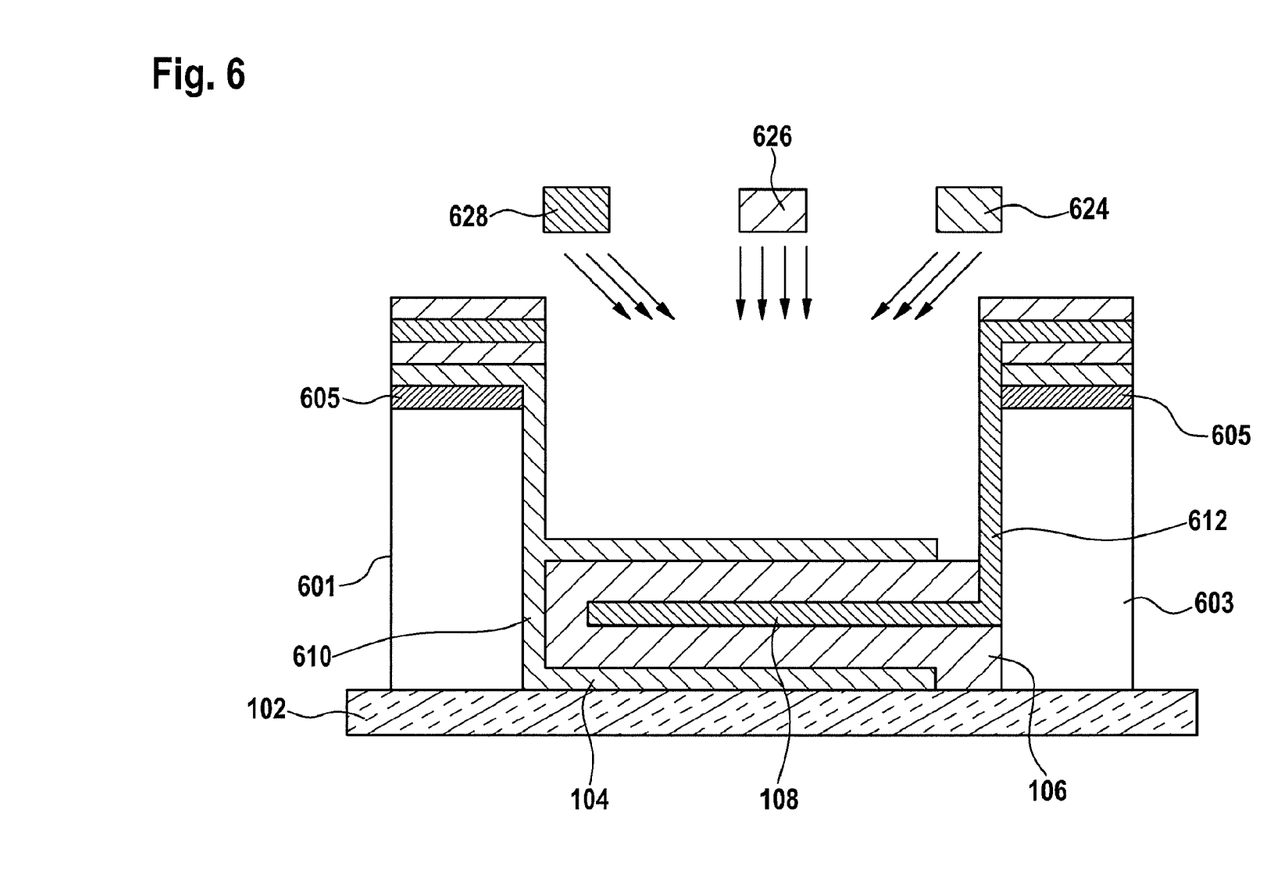
FIG. 6 shows a thin-film battery during production, according to one exemplary embodiment of the present disclosure.

FIG. 6 shows a cross-sectional illustration of a thin-film battery in a production stage, for example by means of the production method described with reference to FIG. 5, according to one exemplary embodiment of the present disclosure.

The figure shows a mount structure 102 which forms a base surface. A first barrier 601 and a second barrier 603 are arranged on the mount structure 102. The barriers 601, 603 may each have a cuboid shape, in which case a height of the barriers 601, 603 may be greater than a width. The height of the barriers 601, 603 may be greater than a subsequent height of a layer structure in the thin-film battery. The barriers 601, 603 may form structures which may be non-conductive or may be provided with electrical insulation. A conductive layer 605, which forms a possible subsequent contact-making area, can in each case be arranged on a surface of the barriers 601, 603 opposite the mount structure 102.

Layers 104, 106, 108 of the thin-film battery can be applied to the mount structure 102, and in particular to an area of the mount structure which is arranged between the barriers 601, 603. The layers 104, 106, 108 can be applied in a different sequence. The figure shows a first electrode layer 104, which is applied to a surface of the mount structure 102. The first electrode layer 104 is adjacent to the first barrier 601, but is at a distance from the second barrier 603. An intermediate space is therefore formed between the first electrode layer 104 and the second barrier 603. A battery layer 106 is arranged in the intermediate space and on the first electrode layer 104. The battery layer 106 is adjacent to the second barrier, but is separated from it by a first contact-making layer 610, which runs along an inner side wall of the first barrier 601. The first contact-making layer 610 is connected to the first electrode layer 104. A second electrode layer 108 is applied to the battery layer 106. The second electrode layer 108 is adjacent to the second barrier 603, but is at a distance from the first barrier 601. An intermediate space is therefore formed between the second electrode layer 108 and the first barrier 601. A further battery layer 106 is arranged in the intermediate space and on the second electrode layer 108. The further battery layer 106 is separated from the first barrier 601 by the first contact-making layer 610, and is separated therefrom by a further contact-making layer 612, which runs along an inner side wall of the second barrier 603. The second contact-making layer 612 is connected to the second electrode layer 108. Further layers 104, 106, 108 may be applied in a corresponding manner to this. Layers which correspond to the layers 104, 106, 108 which are arranged between the barriers 601, 603 are arranged on the conductive layers 605 of the barriers 601, 603.

The first electrode layer 104 can be applied by applying a first electrode material 624 in the direction indicated by arrows to the mount structure 102. The arrows in this case represent an unmasked or unstructured material flow. Since the first electrode material 624 is applied to the mount structure 102 obliquely, coming from the side of the second barrier 603, the second barrier 603 acts as a shadow mask. The first electrode material 624 therefore arrives at the conductive layers 605 of the barriers 601, 603, on the inner wall area of the first barrier 601, in order to form the first contact-making layer 610, and on the area which is located between the barriers 601, 603, with the first electrode material 624 in this case not extending to the inner wall of the second barrier 603, because of the shadowing by the second barrier 603.

The battery layer 106 can be applied by applying a battery layer material 626 in the direction indicated by arrows to the mount structure 102. Since the battery layer material 626 is actually applied to the mount structure 102 from above, it can reach and fill the entire area between the barriers 601, 603. Because of the application direction, only a small amount of material 626 is deposited during an application step 506 on the contact-making layers 610 and 612 which are located on the side walls. Subsequent deposition steps 504 and 508 with respectively additionally applied material 624 and 628 thus reinforce the contact-making layers 610 and 612. The cross sections of the electrical connection are therefore reinforced, which may be particularly advantageous for batteries with which contact is made from above.

The second electrode layer 108 can be applied by applying a second electrode material 628, in the direction indicated by arrows, to the mount structure 102. Since the second electrode material 628 is applied to the mount structure 102 coming obliquely from the side of the first barrier 601, the first barrier 601 acts as a shadow mask. The second electrode material 628 therefore arrives at the conductive layers 605 on the barriers 601, 603 on the inner wall area of the second barrier 603, in order to form the second contact-making layer 612, and on the area which is located between the barriers 601, 603, with the second electrode material 628 in this case not extending to the inner wall of the first barrier 601, because of the shadowing by the first barrier 601. Because of the shadow thrown by the first barrier 601, the longitudinal extent of the second electrode layer 108 is limited in the direction of the first barrier 601. The second electrode layer 108 is therefore separated from the first contact-making layer 610. The intermediate space between the second electrode layer 108 and the first contact-making layer 610 can be filled with the battery layer material 626, if a further battery layer 108 is applied in a next method step.

The substrate structures, as shown in the detail in FIG. 6, for selective deposition of parallel-connected thin-film battery cells by means of different deposition directions can be achieved by a deposition sequence in which the first electrode material 624 is deposited first of all, followed by the battery layer material 626, then the second electrode material 628, then the battery layer material 626 again, and finally, once again, the first electrode material 624.

Further barriers can be provided on the substrate 102, thus allowing further battery layers to be formed subsequently on the outer walls of the barriers 601, 603, by the first electrode material 624, the battery layer material 626 and the second electrode material 628. This allows layers for a plurality of thin-film batteries which are arranged alongside one another to be applied in one method step.

Figure 7:
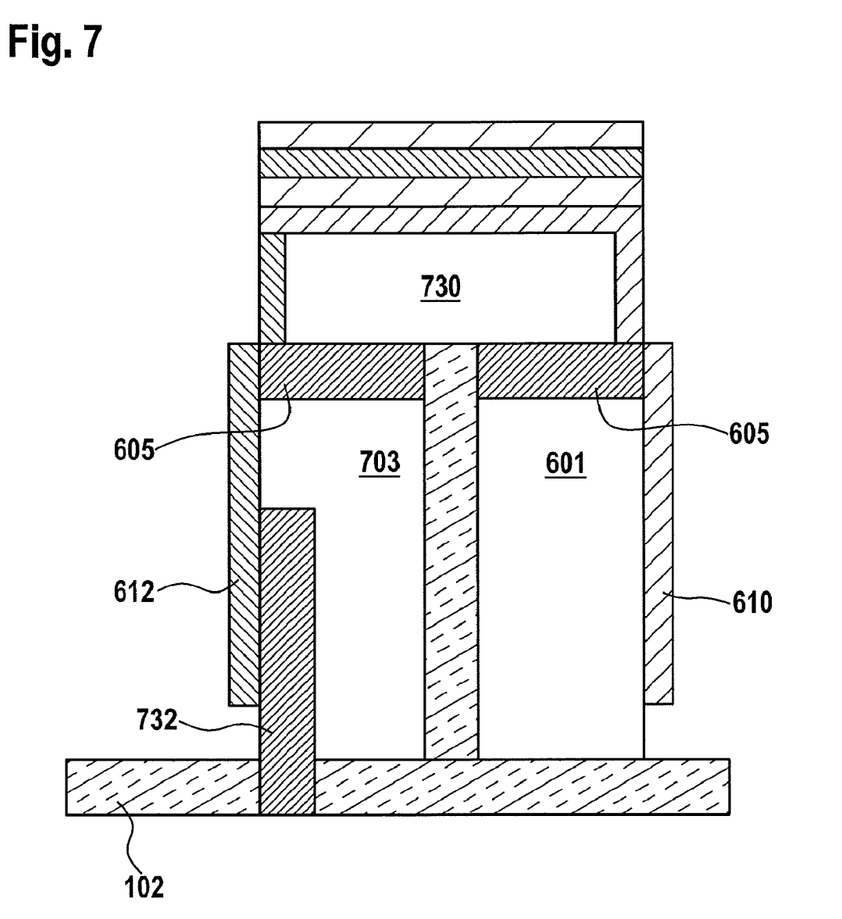
FIG. 7 shows a barrier for production of a thin-film battery, according to one exemplary embodiment of the present disclosure.

A further method for production of multilayer batteries with parallel contact being made, according to one exemplary embodiment of the present disclosure, is illustrated in FIGS. 5 and 6. A corresponding structure 601, 603, which is provided on the substrate 102, for example rectangular, polygonal and/or round raised or recessed structures, is used in order to allow electrode layers to be applied on a position-resolved basis during an anisotropic coating process. By way of example, a physical vapor deposition process is particularly suitable for this purpose. These structures can at the same time also be used for subsequent outward contact making, for example by application of a UBM layer and a subsequent flip-chip mounting process. An insulating version of these structures is illustrated in FIG. 6. However, it is also possible for these structures to be made entirely or partially conductive at this stage, for contacts to be made subsequently, as is shown in FIG. 7. After application, the electrode layers 104, 108 must be separated at those points at which they are connected to one another. It is particularly advantageous to even partially remove the structures on the substrate 102 on which the electrode layers are connected, as far as a contact-making area. This can be done, for example, by polishing them away or by sawing. After polishing away, a contact can also be made with these structures by means of a process as described with reference to FIGS. 4a to 4c, or the contact-making area on the structures may itself once again have a structure which allows selected deposition as far as possible of only one electrode layer at one point or at one contact, as is shown in FIG. 7. A further option is for contacts to be provided to the electrode layers 104, 108 in the substrate 102 itself, for example by means of vias through the substrate 102. FIG. 7 shows one possible example.

FIG. 7 shows a barrier for production of a thin-film battery, according to one exemplary embodiment of the present disclosure. To be more precise, two barriers 601, 703 are shown, which can be arranged adjacent to one another on the mount substrate 102, separated by an isolating area, for example a cavity. Layers of a thin-film battery can be applied to each of the two sides of the barrier pair 601, 703, with the barriers 601, 703 each being used as shadow masks, as described with reference to FIGS. 5 and 6. The mount substrate 102 may have structures for making contact with the battery electrodes. Conductive layers 605 are arranged on each of the barriers 601, 703 and allow contact to be made subsequently. The conductive layers 605 may completely cover an upper face of the barriers 601, 703, but leave the intermediate space between the barriers 601, 703 free. Optionally, the conductive layers 605 can be electrically conductively connected over the intermediate space, in order to allow series connection of two thin-film batteries, which can be produced on both sides of the barrier pair 601, 703. An insulating cover 730 is arranged on the conductive layers 605, and covers them. The insulating cover 730 can subsequently be removed with the deposited layers which are located on the insulating cover 730.

On its side edge area, the barrier 703 has a cutout, for example in the form of a groove. A via 732 can be arranged in the cutout. The via 732, as a via through the mount substrate 102, can allow contact to be made in an alternative manner with the thin-film battery. A first contact-making layer 610 of the first battery electrode and a second contact-making layer 612 of the second battery electrode are shown on each of the outer wall areas of the barriers 601, 703, with these layers having already been deposited during the production process.

FIG. 7 therefore shows one exemplary embodiment of the configuration of a structure for making contact selectively. Battery layers and electrode layers have already been partially deposited, in the sequence shown in FIG. 6.

Figure 8:
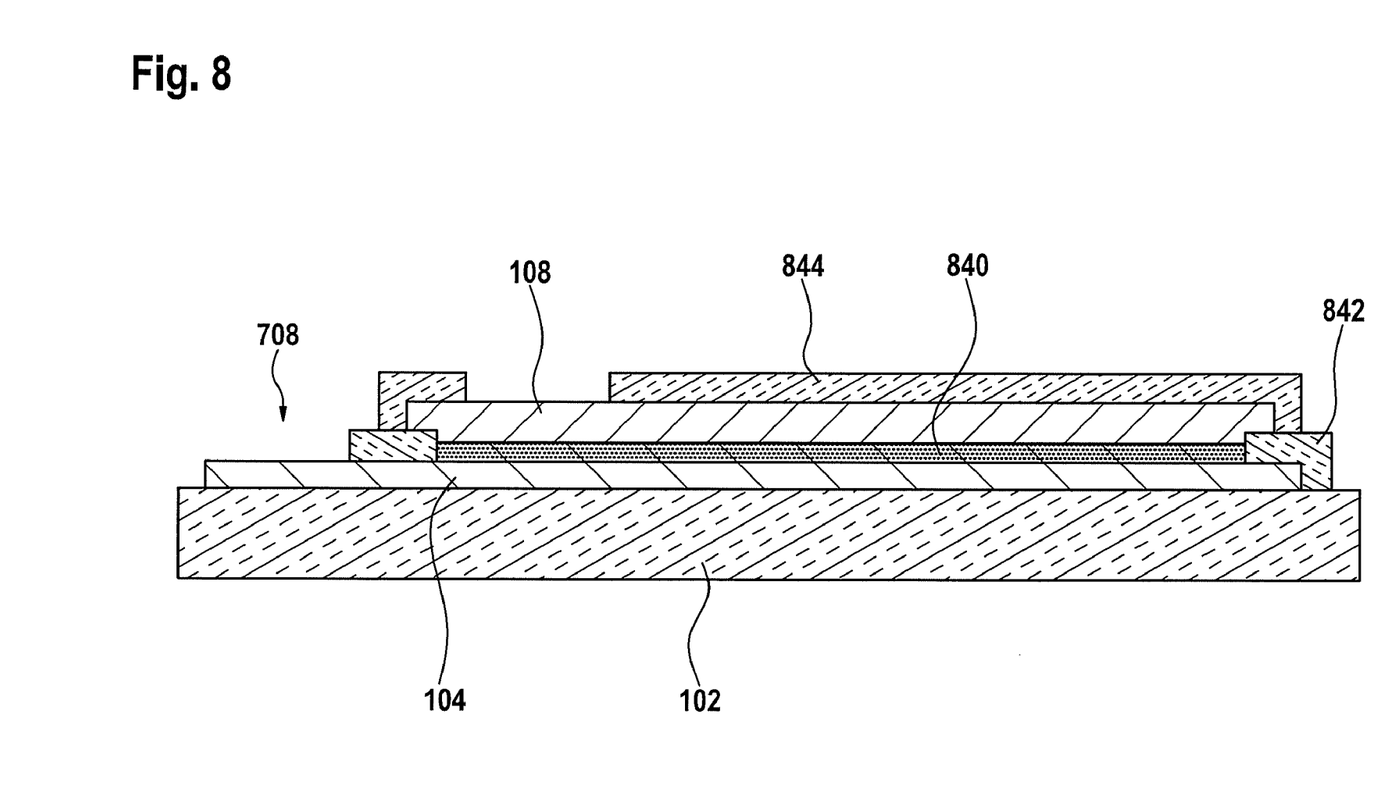
FIG. 8 shows a thin-film battery, according to a further exemplary embodiment of the present disclosure.
Figure 9:
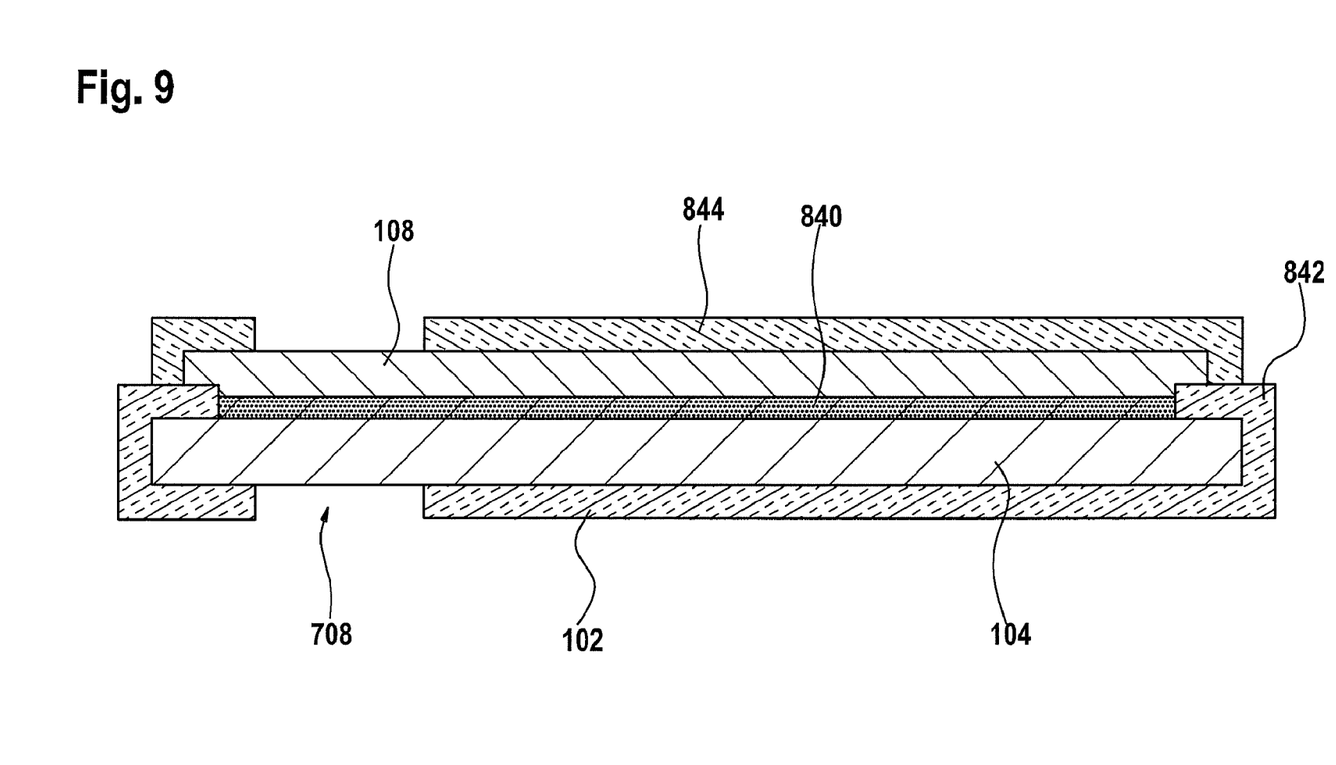
FIG. 9 shows a thin-film battery, according to a further exemplary embodiment of the present disclosure.

FIGS. 8 and 9 show thin-film batteries, according to further exemplary embodiments of the present disclosure, in which at least one of the electrode layers is structured in order to enlarge the effective contact area to the adjacent battery layer. By way of example, the electrode layers may be porous, thus allowing the battery layer material to penetrate at least partially into the interior of the electrode layers. Electrode layers such as these can also be used in conjunction with the exemplary embodiments described with reference to FIGS. 1 to 7. This means that the electrode layers in the stack structures shown in FIGS. 1 to 7 are structured as described with reference to FIGS. 8 and 9.

The electrode materials can be structured and made porous mechanically, for example by stamping, thermally, for example by whisker formation, or by chemical processes such as etching, or physical methods such as trench formation or sputtering. Ideally, a metallic or partially metallic multiphase system can be applied homogeneously, separated by an appropriate treatment, and in the process forming a conformal thin metal layer on a base which is rough in a defined manner. It is also possible to separate out one phase, thus creating a porous metal layer.

Porous layers can likewise be deposited directly, electrochemically, by means of flame spraying processes or from the gas phase. If required, the mount substrate may even be totally omitted in a corresponding layer structure and layer thickness of the electrode metals, and the electrode material can then carry out the tasks of a mount and that of passivation against environmental influences, for example against oxygen.

FIG. 8 shows a cross-sectional illustration through a thin-film battery, according to a further exemplary embodiment of the present disclosure. The figure shows one implementation of a 3D thin-film battery with an electrode which has been partially structured and/or made porous and/or passivated. The mount substrate may be structured, for example in the form of trenches, although this is not shown.

The thin-film battery has a mount substrate 102, a first electrode 104 and a second electrode 108 with battery layers. The mount substrate may be structured, in order to enlarge the surface area, on a side facing the first electrode 104. The battery layer is arranged between the first electrode 104 and the second electrode 108. The first electrode 104 has an area 840, which has been structured and/or made porous, with a large surface area. The area 840 enlarges the effective contact area with the battery layer.

Furthermore, passivation 842 is shown on the first electrode 104. The passivation 842 forms insulation on edge areas of the first electrode 104. Further passivation 844 is arranged on the second electrode 108. Starting from the passivation 842, the further passivation 844 extends over the entire surface of the second electrode 108, with the exception of an opening. The passivation 842 on the first electrode 104 has an opening 846 which, for example, forms a bonding pad for making electrical contact with the first electrode 104.

A further advantage, which is critical for the packaging and storage density, is achieved by application of continuous or structured passivation on the electrode material. This is particularly the case when the passivation, for example in the case of aluminum, is produced as a current collector material by oxidation from the already applied current collector layer or electrode, and then partially protects this on the surface. It is also advantageous for the passivation and porosification to be produced entirely or partially in one process or process step.

FIG. 8 shows a corresponding configuration. The passivation 842 of the electrode 104 on the substrate 102 is directly adjacent to the area 840 which has been made porous, and therefore provides protection against shorting with the second electrode 108, which is applied to the battery layers, which are not shown in FIG. 8. This second electrode 108 is likewise passivated 844. Usable areas for making electrical contact, for example in the form of a bonding pad, are created by the openings 708 in the passivation layers 842, 844. If required, a flip-chip process can also be used for assembly of the battery, with an appropriate contact configuration.

FIG. 9 shows a cross-sectional illustration through a thin-film battery, according to a further exemplary embodiment of the present disclosure. The figure shows one implementation of a 3D thin-film battery, without a mount substrate, on an electrode film. This results in a thin, film-like structure.

In a corresponding manner to that in FIG. 8, the thin-film battery shown in FIG. 9 has a first electrode 104 and a second electrode 108 with battery layers. The battery layer or the battery layers is or are arranged between the first electrode 104 and the second electrode 108. The first electrode 104 has an area 840 which has been made porous. Furthermore, a passivated area 842 of the first electrode 104 and further passivation 844 on the second electrode 108 are shown. The passivated area 842 of the first electrode 104 also extends, alongside the edge area or junction area to the second electrode 104, over a side of the first electrode 104 which faces away from the second electrode. The passivation 842 on the first electrode 104 has an opening 846.

As is shown in FIG. 9, the passivations 842, 844 on the two electrodes 104, 108 may each be opened at the same position. A plurality of layers of batteries, in a stacked structure, can be directly electrically connected at these openings. Other electrical contacts are likewise possible at these points, with a suitable configuration of the electrodes 108 and 708, for example by wire bonding, adhesive bonding or compression springs.

A combination of the features in FIGS. 8 and 9 is likewise feasible, for example a configuration with a very thin mount substrate in the form of a surface-structured polymer film or metal film, to which a layer which has additionally been structured and/or been made porous is applied as an electrode.

If the electrodes are structured or made porous to a major extent, and/or if the layer thicknesses of the porous materials are large, this will result in highly conformed deposition of the battery layers, and of the second electrode, since shorts can otherwise be expected. Methods such as atomic layer deposition, in particular, offer advantages here.

The thin-film batteries according to the disclosure may, for example, be used in smart cards, autonomous sensor networks and active RFIDs.

The exemplary embodiments described and illustrated in the figures have been chosen only by way of example. Different exemplary embodiments can be combined with one another completely, or in terms of individual features. Features of a further exemplary embodiment can also be added to one exemplary embodiment. Furthermore, method steps according to the disclosure can be repeated, and carried out in a sequence other than that described here. When an exemplary embodiment includes an "and/or" link between a first feature and a second feature, then this can be read as meaning that the exemplary embodiment has both the first feature and the second feature according to one embodiment, and has either only the first feature or only the second feature according to a further embodiment.

What is claimed is:

1. A method for production of a thin-film battery, comprising:
    applying a first unmasked flow of a first electrode material to a mount structure in order to form a first electrode layer on the mount structure;
    applying a second unmasked flow of an electrolyte material directly on the surface of the first electrode layer in order to form a battery layer on the first electrode layer;
    applying a third unmasked flow of a second electrode material directly on the surface of the battery layer in order to form a second electrode layer on the battery layer;
    repeating the step of applying a second unmasked flow of an electrolyte material directly on the surface of the second electrode layer to form a battery layer on the second electrode layer;
    repeating the applying steps commencing with applying an unmasked flow of the first electrode material directly on the surface of the battery layer formed on the second electrode layer and ending with the step of applying a third unmasked flow of a second electrode material in order to produce a thin-film battery which includes a plurality of first electrode layers, a plurality of battery layers and a plurality of second electrode layers; and
    thereafter structuring the thin-film battery.

2. The method according to claim 1, further comprising:
    applying a fourth unmasked flow of an insulating material in order to form an insulating layer before applying the first unmasked flow to the mount structure and/or after applying last layer of the second electrode layer.

3. The method according to claim 1, wherein the first and/or the second electrode material is applied such that the first and/or the second electrode layer have/has a porous structure.

4. The method according to claim 1, further comprising:
    exposing end areas of the first electrode layers and/or of end areas of the second electrode layers; and
    making contact between the end areas of the first electrode layers and/or the end areas of the second electrode layers.

5. The method according to claim 1, wherein the mount structure has a base surface with a first barrier and a second barrier, which is arranged opposite the first barrier, the first unmasked flow is applied obliquely over the first barrier to the base surface, and the third unmasked flow is applied obliquely over the second barrier to the base surface.

6. The method according to claim 1, wherein the second unmasked flow is applied at right angles to the mount structure.

* * * * *